United States Patent Office 2,695,437
Patented Nov. 30, 1954

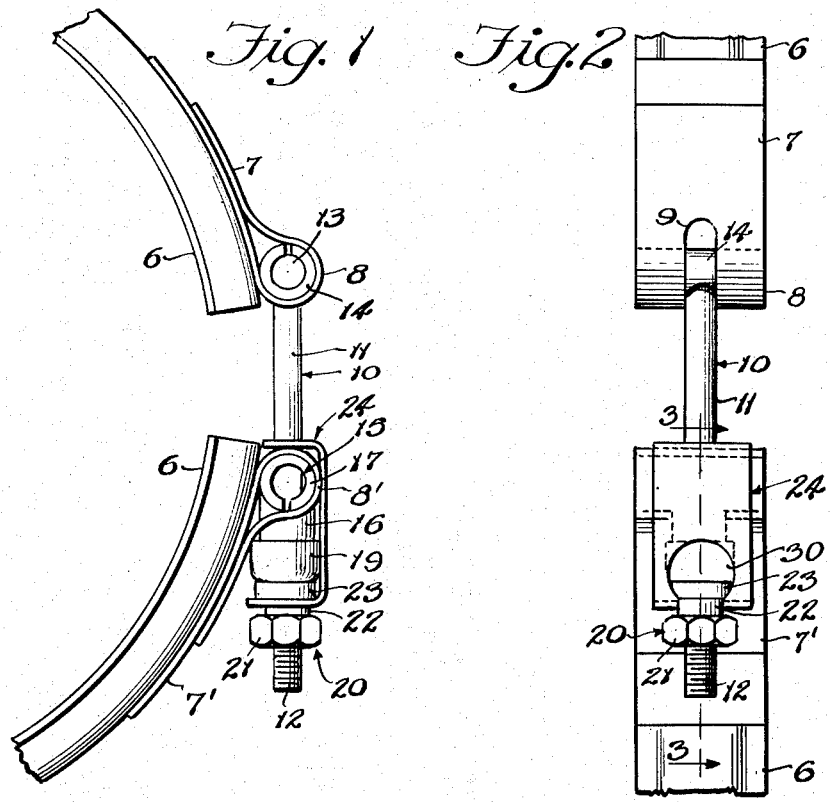
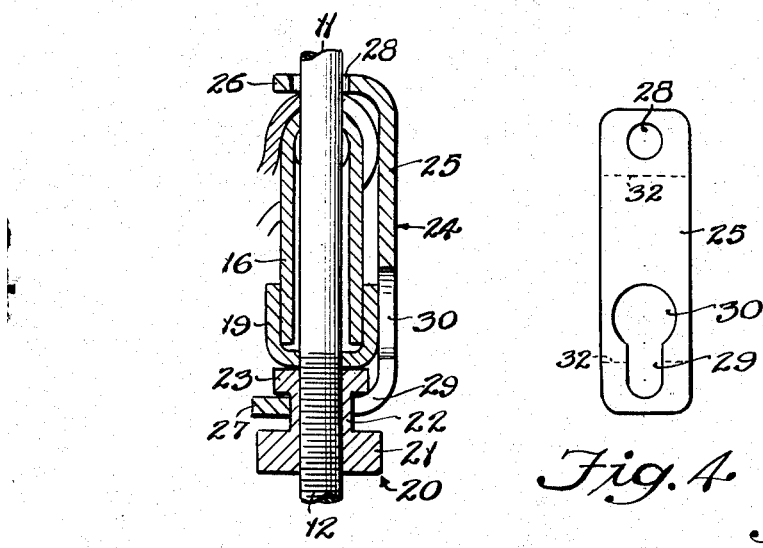

2,695,437

BAND CONNECTOR MECHANISM

Fred A. Bernard, Woodland Hills, Calif., assignor to Marman Products Company, Inc., Inglewood, Calif., a corporation of California Application April 15, 1952, Serial No. 282,493

3 Claims. (Cl. 24—279)

This invention relates to clamping bands, tube couplings, and the like, and has as its general object to provide an improved connector mechanism for such devices. The primary object of the invention is to provide a screw-bolt type of take-up or band tightening connector mechanism for connecting adjacent ends of a split band or tube coupling, said connector mechanism having means for positively transmitting spreading ("backing off") movement to the ends of the band as well as for drawing them together.

A specific object of the invention is to provide such a take-up mechanism, which is of simple, durable and inexpensive construction.

Other objects will become apparent in the ensuing specifications and appended drawings in which:

Fig. 1 is a side view of a band connector mechanism embodying my invention;

Fig. 2 is a front view of the same;

Fig. 3 is a detail sectional view taken on the line 3—3 of Fig. 2;

Fig. 4 is a detail view of the stamped sheet metal blank from which the back-off clip is fabricated; and Fig. 5 is a detail view of the completed back-off clip.

Referring now to the drawings in detail, I have shown at 6 in Figs. 1 and 2, adjacent end portions of a tube connector band of the type commonly referred to in the art as a "V-band." Welded to the outer faces of these adjacent end portions of the band are stirrups 7, 7', having respective loops 8, 8', slotted as indicated at 9.

My improved connector mechanism includes, in combination with the stirrups 7, 7', a T-bolt 10 having a shank 11, the end portion of which is threaded at 12, and having a T-head 13 integral therewith. Head 13 is preferably enclosed in a split bearing bushing 14 which bears within the loop 8.

The connector mechanism further includes a T-trunnion unit 15 including a tubular shank portion 16 and a tubular T-head 17 which provides a pair of oppositely projecting trunnions received in the bearing loop 8'. Trunnion unit 15 may be fabricated in split-tubular form, with the shank 16 in two sections the ends of which are received in and secured by a binding cap or ferrule 19.

A nut 20 is threaded onto threaded end portion 12 of shank 10, and bears against cap 19 to apply pressure through trunnion 15 to one end of the band 6, while a pull is applied by the T-head 13 of bolt 10 to the other end of the band. Nut 20 has a squared or hexagonal head 21, a reduced neck portion 22, and an end flange 23.

When the nut 20 is backed off, its movement is transmitted to stirrup 7' through a back-off clip 24 of generally C-shape, including a web 25 and arms 26 and 27 bent at right angles thereto at the respective ends thereof. Clip 24 receives and embraces loop 8 and trunnion unit 15. Arm 26 has an opening 28 through which bolt shank 11 projects. Arm 27 has a slot 29, just wide enough to snugly receive neck 22, but too narrow for flange 23 to pass therethrough. Slot 29 is of the bayonet type, having at one end thereof an enlarged opening 30 of a diameter sufficient to permit the passage of flange 23. Opening 30 is disposed in web 25 and joined to slot 29 by an extension of the latter which extends around the bend between web 25 and end portion 27. Head 21, flange 23, and neck 22 of nut 20 cooperatively define an annular groove in which arm 27 is received, thus positioning nut 20 relative to the clip 24. Neck 22 extends through slot 29.

In the back-off operation, flange 23 exerts pressure against arm 27 of the clip, and arm 26 transmits this pressure to loop 8'. Web 25 of the clip bears flatly against loop 8' throughout the width thereof, whereby to maintain the clip in the position shown in Fig. 1, restraining it from rotating around shank 11.

The back-off clip may be constructed very simply in the form of a sheet metal stamping as shown in Fig. 4, with the arms 26 and 27 subsequently bent along the lines indicated at 32.

I claim:

1. In a band clamp, in combination with a split band having loops at its respective ends: a connector assembly including a T-bolt having at one end a head bearing in one of said loops and having its other end threaded; a trunnion unit having a tubular shank through which said bolt extends and having a head comprising oppositely projecting trunnions bearing in the other of said loops; a nut threaded on said bolt and having one end bearing against the end of said tubular shank, said nut including a flange at said one end, a head axially spaced from said flange, and a reduced neck portion between said head and flange; and a back-off clip being C-shaped as viewed edgewise, including a web and a pair of generally parallel arms extending in a common direction from the web and defining substantially right dihedral angles with respect to the general plane of the web, said clip embracing both the trunnion unit and the other band loop, with said web extending alongside said trunnion shank, with one of said arms bearing against said other loop and having an opening through which said T-bolt extends, and with the other of said arms having a slot through which said reduced neck portion of the nut extends, said flange bridging across said slot and being engaged between said other arm and the end of said tubular shank, said web having an opening, wider than said slot, through which said flange may pass, said opening communicating with said slot to provide for insertion of said nut into or removal of said nut from said slot by passing said flange through said opening when said nut is detached from said T-bolt.

2. A band clamp as defined in claim 1, wherein said web has a flat inner face bearing against the band loop embraced within said clip, to position said clip against rotating movement around said bolt.

3. A band clamp as defined in claim 1, wherein said tubular shank abuts the inner side of said web to position said nut with its said reduced neck portion substantially bottomed at the end of said slot in said other arm, whereby said shank and web are maintained in closely adjacent, parallel relation.

References Cited in the file of this patent

UNITED STATES PATENTS

| Number | Name | Date |
|---|---|---|
| 219,649 | Page | Sept. 16, 1879 |
| 1,158,414 | Amborn | Oct. 26, 1915 |
| 1,604,875 | Bogaty | Oct. 26, 1926 |
| 2,270,375 | King | Jan. 20, 1942 |